United States Patent Office

3,682,874
Patented Aug. 8, 1972

3,682,874
PROCESS FOR THE PRODUCTION OF POLYMERIZATES OF VINYL CHLORIDE
Johann Bauer and Alex Sabel, Burghausen, Upper Bavaria, Germany, assignors to Wacker-Chemie G.m.b.H., Munich, Germany
No Drawing. Continuation-in-part of application Ser. No. 785,339, Dec. 19, 1968. This application Jan. 27, 1970, Ser. No. 6,325
Claims priority, application Germany, Dec. 20, 1967, P 17 45 569.5
Int. Cl. C08f 15/20, 1/08
U.S. Cl. 260—87.5 C      1 Claim

ABSTRACT OF THE DISCLOSURE

An improvement in the precipitation polymerization of vinyl chloride with up to 30% of other polymerizable monomers including ethylene which comprises the steps of polymerizing vinyl chloride in the presence of a free-radical polymerization catalyst in a solvent media in which the monomers are soluble and the polymerizates are insoluble under vinyl chloride polymerization conditions which involves the use of saturated organic compounds containing fluorine, carbon and possibly chlorine and hydrogen in which at least three of the aforesaid halogen atoms are bonded to at least one carbon atom, as said solvent media.

REFERENCE TO A PRIOR APPLICATION

This application is a continuation-in-part of our copending United States patent application Ser. No. 785,339, filed Dec. 19, 1968 and now abandoned.

THE PRIOR ART

Polymerizates of vinyl chloride which are prepared by polymerization in water as a reaction medium have, for instance, the disadvantage that generally they are contaminated by the presence of dispersing agents which were used as adjuvants for the polymerization. This contamination can decrease, for instance, the thermal stability, the optical clarity and/or the electrical insulating properties of objects prepared from such polymerizates and/or can increase the water absorptivity of such objects.

Such disadvantages are circumvented with the so-called "block" or "mass" or "substance-precipitation" polymerization of vinyl chloride [see W. Foerst "Ullmann's Encyklopädie der Technischen Chemie," vol 14, München-Berlin 1963, p. 125]. The "substance-precipitation" polymerization of vinyl chloride has the disadvantage, for example, that difficulties occur relating to the control of the reaction temperature and to the production of products with a comparatively low degree of polymerization, also in the preparation of copolymers, a clumping of the particles of such copolymers occurs. It is equally disadvantageous that in most cases the "substance-precipitation" polymerization of vinyl chloride can only be carried out to give a yield at the most of 70% by weight of the monomers employed.

All these disadvantages can be avoided in the preparation of polymerizates of vinyl chloride through precipitation polymerization [see W. Foerst, loc. cit. p. 126, and Schildknecht "Polymer Processes," New York, 1956, pp. 190–191]. This is the polymerization of vinyl chloride or of mixtures of vinyl chloride and other monomers polymerizable therewith in a solvent media as the reaction medium, in which the monomer or monomers is or are totally soluble as compared with the polymerizates which remain insoluble. However, as yet, no solvent has become known which would serve this purpose and which would not lead to polymerizates with an undesirably low degree of polymerization due to strong regulating effects, that is, through chain transfer at polymerization temperatures most often employed and/or whose use would not create a great fire hazard and/or which would not require, as does water, the concurrent use of dispersing agents and/or whose use gives a low rate of reaction.

OBJECTS OF THE INVENTION

An object of the present invention is the development of a process for the preparation of polymerizates of vinyl chloride free from all the disadvantages which were described above.

Another object of the invention is the development in the process for the preparation of polymerizates by precipitation copolymerization of vinyl chloride which comprises the steps of copolymerizing monomer mixtures containing at least 70% by weight of vinyl chloride and up to 30% by weight of ethylene, in the presence of a free-radical polymerization catalyst under vinyl chloride polymerization conditions in a solvent media in which said monomers are soluble and the polymerizates are insoluble, and recovering said insoluble polymerizates, the improvement which comprises utilizing saturated carbon compounds containing fluorine atoms and other atoms selected from the group consisting of fluorine, chlorine, and hydrogen bonded to said carbon atoms wherein at least one fluorine and at least two of the aforesaid halogen atoms are bonded to at least one carbon atom, as said solvent media.

These and other objects of the invention will become more apparent as the description thereof proceeds.

DESCRIPTION OF THE INVENTION

It has now been found that the disadvantages of the prior art can be overcome and the above objects can be achieved in the employment, in precipitation copolymerization of vinyl chloride and ethylene, of saturated aliphatic compounds which are prepared from fluorine and carbon, possibly chloro and/or hydrogen atoms as well are used, as a reaction medium, and in which at least three halogen atoms are connected with at least one carbon atom.

In order to avoid unnecessary difficulties in the drying of the polymerizates, it is useful to employ such fluorine compounds which have a boiling point of below 120° C. at 760 mm. Hg (abs.). Since on the one hand they do not develop undesired high pressure in the polymerization autoclave at polymerization temperatures, and on the other hand, can be separated from the polymerizate, due to their low boiling point, and are easily accessible, preferred examples for reaction media of the invention are halogenated ethanes and methanes containing at least one fluorine atom and at least three halogen atoms attached to a carbon atom, which boil below ordinary room temperature, such as 1,1,2,2-tetrafluorodichloroethane, 1,2,2-trifluorotrichloroethane, difluorodichloromethane, monofluorotrichloromethane and monofluorodichloromethane. The saturated aliphatic compounds utilized in the process of the invention are halogenated hydrocarbons containing one or more fluorine atoms and at least three halogen atoms of fluorine or chlorine bonded to one carbon atom.

Other examples for reaction media which are suitable for the invention are octofluorocyclobutane, pentafluoromonochloroethane, difluoromonochloromethane, trifluoromonochloromethane, trifluoromethane, perfluoroethane, perfluoropropane, the perfluorobutanes, the perfluoropentanes, monochloroheptafluoropropane, the dichlorohexafluoropropanes, the monochloromonofluorobutanes, the dichlorooctafluorobutanes and the dichlorodecafluorobutanes. The preparation of these fluorine compounds is known and many of these compounds are sold in commerce. Mixtures of different fluorine compounds may be used as well.

Within the framework of the present invention, when mixtures of vinyl chloride and ethylene are employed, then the amount of vinyl chloride in such mixtures should amount preferably to at least 70% by weight, with reference to the total weight of the monomer mixture. By the copolymerization of vinyl chloride with ethylene according to common methods in an aqueous suspension or aqueous emulsion in the low pressure range of up to 50 atm., copolymers are obtained which contain rarely more than 8% by weight of ethylene units. This proportion of olefin can almost be doubled with the aid of the polymerization process of the present invention. The thus prepared copolymers are particularly suitable for varnishes as well as for adhesives.

The weight ratio between the fluorine compounds used as reaction medium and the monomers to be polymerized is not critical. Of course, the amount of the monomers to be polymerized in the total weight of the fluorine compounds to be used as reaction medium plus the monomers to be polymerized should not exceed 95% since, otherwise, "substance-precipitation" polymerization conditions would exist. Generally, 0.8 to 9, preferably 1 to 4, parts by volume of the fluorine compounds used in the reaction medium in liquid form are employed per each part by weight of the monomer or monomers. The upper limit of the amount of fluorine compounds, used as reaction medium, per part by weight of the monomer or monomers is solely determined by economic considerations.

The additional use of dispersing agents such as emulsifiers and protective colloids is not required for the process of the present invention and preferably dispersing agents are not employed at all.

Advantageously, monomer-soluble free-radical producers are used as polymerization catalysts. Examples of such free-radical producers are peroxidic compounds producing free-radicals such as the diacyl peroxides, e.g., diacetyl peroxide, didecanoyl peroxide, acetylbenzoyl peroxide, dilauroyl peroxide, dibenzoyl peroxide and bis-2,4-dichlorobenzoyl peroxide; dialkyl peroxides, such as, for example, di-tert.-butylperoxide; peroxydicarbonates, such as diisopropylperoxydicarbonate and di-(2-ethylhexyl)-peroxydicarbonate; peroxycarboxylic acid esters such as tert.-butyl perpivalate and tert.-butyl perethoxyacetate; mixed anhydrides of organic sulfonic peroxy acids with carboxylic acids, such as acetylcyclohexanesulfonyl peroxide; azo compounds which are known as polymerization catalysts such as, for example, azoisobutyric acid dinitrile; as well as metal organic compounds known as polymerization catalysts, such as, for example, triethylboron. Mixtures of known different free-radical producers may be used as well. These free-radical producers may be used in the amounts common for the polymerization of vinyl chloride. These amounts range from 0.00005% to 3% by weight, particularly 0.001% to 1% by weight, based on the weight of the monomer or monomers, respectively. If desired, adjuvants, other than the already mentioned substances, can be employed in the process of the invention such as molecular-size regulators, for example, chlorinated hydrocarbons, alcohols or aldehydes; or substances for the improvement of the electrical properties of the polymerizates, for example, calcium oxide or magnesium oxide. However, the weight of these substances should not exceed 5% of the weight of the monomer or monomers. The polymerization temperature lies in the range common for the polymerization of the vinyl chloride, namely, —85° C. to 120° C., particularly 0° C. to 80° C.

Advantageously, the polymerization is carried out while the polymerization recipe is being stirred. If desired, the polymerization may be carried out in vessels which are provided with reflux cooling condensers in order to facilitate the dissipation of the heat created by the reaction. For instance, due to the easy separability of the reaction medium from the polymerizates, it is another advantage of the process of the present invention that, without any difficulty, it can be carried out continuously, for instance, in reactors connected in series, or in a tower or in tubes. However, the polymerization may as well be carried out in several stages or semi-continuously.

An unexpected advantage of the use of the fluorinated solvents of the invention is that a faster rate of reaction and a higher percent of copolymer is obtained as compared with other solvents having a low order of chain transfer effect such as benzene.

After the polymerization is complete, the fluorine compounds used as reaction medium may very well be separated by means of centrifuging or filtering or by distillation. The recovered fluorine compounds may again be used for further polymerization as well. Therefore, contrary to polymerization of vinyl chloride in water as the reaction medium, no waste water problems occur.

The polymerizates prepared according to the present invention are mostly recovered as fine powders and are characterized by a great purity so that consequently they exhibit a highly thermal stability and excellent electrical insulating properties. Particularly clear objects such as films, foils and molded plates can be produced from these polymerizates.

The polymerizates of the invention are particularly suitable for thermoplastic moldings, with or without plasticizers, for instance, through calendering, extruding, deep-molding, casting, molding or whirl-sintering and can be worked into coatings, films, foils, even tube foils, plates, even records and containers, for instance, for foodstuffs. The polymerizates can be utilized also in the form of plastisols or organisols. The copolymers are suitable in the form of solutions in lacquer solvents, for instance, for the preparation of coatings or filaments.

The following examples are illustrative of the practice of the invention without being deemed limitative in any manner.

The K-values cited in the following examples were always determined in cyclohexanone. (The K-value is a measurement for the degree of polymerization [see H. Fikentscher in "Cellulosechemie," vol. 13, 1932, p. 58 ff.].)

Example I

First 6 liters of liquid monofluorotrichloromethane in which 12 gm. of acetylcyclohexanesulfonyl peroxide and 28 gm. of dilauroyl peroxide were dissolved, then 4.0 kg. of vinyl chloride, were charged into a stirred enamel-lined autoclave previously purged with nitrogen. Thereafter, sufficient ethylene was empressd into the autoclave so that the pressure inside the autoclave was 39 atmospheres, when the autoclave was heated to 55° C. The contents of the autoclave were then held at this temperature for 18 hours, while the internal pressure was maintained at 39 atmospheres by means of additional pressurization with ethylene. Then by venting the autoclave to atmospheric pressure, the unreacted monomers and solvents were distilled off. (The distillate could be used for another polymerization.) Obtained as residue of this distillation, was a copolymer with a K-value of 35 and a chlorine content of 48.7% by weight. This corresponds to an ethylene content of 14% by weight. At room temperature, the copolymer gave clear solutions in common lacquer solvents, such as ethyl acetate, methylethylketone, toluene and xylene. The polymerizate is particularly suitable to be worked up in such solvents as a varnish.

For comparison purposes, the above preparation was repeated with the difference that in place of the monofluorotrichloromethane, 8 liters of water, purified through ion exchange, together with 0.15% by weight of methyl cellulose, based on the weight of the vinyl chloride, as dispersing agent, were charged. However, the same catalysts, monomers, pressures and temperatures were used. After 19 hours, a copolymer with a chlorine content of 52.3% by weight was obtained. This corresponds to a content of no more than 7.8% by weight of ethylene units. At room temperature the copolymer does not dissolve completely and clearly in lacquer solvents.

Example II

As a further comparison, Example I was repeated utilizing various solvent media as follows:
(1) Monofluorotrichloromethane
(2) Water+0.15% methylcellulose
(3) Tertiary-butanol
(4) Methanol
(5) Benzene Table I shows the results obtained The preceding specific embodiments are illustrative of the practice of the invention. It is to be understood, however, that other expedients known to those skilled in the art may be employed without departing from the spirit of the invention.

We claim:

1. In a process for the preparation of polymerizates by precipitation copolymerization of vinyl chloride and ethylene which comprises the steps of polymerizing monomer mixtures containing at least 70% by weight of vinyl chloride and up to 30% by weight of ethylene in the presence of a free-radical polymerization catalyst under vinyl chloride polymerization conditions at pressures up to 50 atmospheres in a solvent media in which said monomer mixtures are soluble and the polymerizates are insoluble, the improvement which consists of utilizing from 0.8 to 9 parts by volume of monofluorotrichloromethane per one part by weight of said monomer mixtures, as said solvent media.

TABLE I.—COPOLYMERIZATION VINYL CHLORIDE/ETHYLENE

Charge: 4 kg. vinyl chloride are polymerized under a constant ethylene pressure of 39 atm. at 55° C. in a 16 liter autoclave with an agitation of 120 r.p.m.

| No. | Solvent media | Catalyst | Standard reaction time | Reaction rate | $C_2H_4$-content | K-value | Appearance |
|---|---|---|---|---|---|---|---|
| 1 | 6.01 monofluorotrichloromethane | 12 g. ACSP; 28 g. LPO | 18 | 45.7 | 14.0 | 35.0 | Viscous colorless resins. |
| 2 | 8.01 water plus 0.15% methyl cellulose | 12 g. ACSP; 28 g. LPO | 19 | 92.5 | 7.8 | 58.1 | Coarse-PVC. |
| 3 | 6.01 t-butanol | 6 g. ACSP; 28 g. LPO | 18 | 59.0 | 11.9 | 46.2 | Coarse-PVC (partially globular.) |
| 4 | 6.01 methanol | 12 g. ACSP; 28 g. LPO | 18 | 53.3 | 11.2 | 40.3 | Coarse PVC powder. |
| 5 | 6.01 benzene | 12 g. ACSP; 28 g. LPO | 18 | 38.6 | 17.0 | 35.8 | Yellow solution of low viscosity. |

NOTE.—ACSP=Acetylcyclohexanesulfonyl peroxide; LPO=Dilauroyl peroxide.

This table shows that with the use of benzene, as a solvent media, a copolymerizate with the highest ethylene content was obtained. This table also shows, however, that with the fluorinated solvent media of the invention, almost as high an ethylene content of the polymer was obtained. The ethylene content was higher than that obtained with the other solvents. Completely unexpectedly, however, this table of comparative results shows that the reaction rate, (percent of copolymer produced under comparable conditions) utilizing the solvent of the invention, is considerably higher than the reaction rate utilizing benzene as the solvent media. The compartive results indicate comparable K-values for the copolymers produced, utilizing the fluorinated solvent of the invention and benzene. This clearly demonstrates that under reaction conditions of copolymerization of vinyl chloride and ethylene, a chain transfer effect of benzene and the fluorinated solvent media of the invention are the same (equal K-values). It was, therefore, unexpected to find, utilizing the fluorinated solvent media of the invention, that a copolymerizate was obtained with a high ethylene content at a considerably higher conversion rate.

References Cited

UNITED STATES PATENTS

| 2,700,661 | 1/1955 | Miller | 260—92.8 |
| 2,700,662 | 1/1955 | Young et al. | 260—92.8 |

FOREIGN PATENTS

| 1,035,339 | 7/1966 | Great Britain | 260—87.5 C |
| 641,679 | 8/1950 | Great Britain | 260—87.5 C |

OTHER REFERENCES

Schildknecht: Polymer Processes, New York, 1956, pp. 190–191.

JOSEPH L. SCHOFER, Primary Examiner

J. A. DONAHUE, JR., Assistant Examiner